United States Patent [19]

Tanabe

[11] Patent Number: 5,079,762
[45] Date of Patent: Jan. 7, 1992

[54] ASYNCHRONOUS TRANSFER MODE SWITCHING NETWORK USING WAITING BUFFERS FOR ROUTING HIGH SERVICE GRADE CELLS DURING CONGESTED TRAFFIC

[75] Inventor: Sen'ichi Tanabe, Tokyo, Japan
[73] Assignee: NEC Corporation, Tokyo, Japan
[21] Appl. No.: 590,377
[22] Filed: Sep. 28, 1990

[30] Foreign Application Priority Data

Sep. 29, 1989 [JP] Japan ................................ 1-254121

[51] Int. Cl.[5] .......................................... H04L 12/56
[52] U.S. Cl. ...................................... 370/60; 370/94.1
[58] Field of Search ................. 370/60, 94.1, 61, 58.1, 370/58.2, 85.6, 60.1, 94.2; 340/825.5, 825.51

[56] References Cited

U.S. PATENT DOCUMENTS

| | | | |
|---|---|---|---|
| 4,621,359 | 11/1986 | McMillen | 340/825.5 |
| 4,760,570 | 7/1988 | Acampora et al. | 370/60 |
| 4,761,780 | 8/1988 | Bingham et al. | 370/94.1 |
| 4,817,084 | 3/1989 | Arthurs et al. | 370/60 |
| 4,891,803 | 1/1990 | Huang et al. | 370/60 |
| 4,893,304 | 1/1990 | Giacopelli et al. | 370/94.1 |

Primary Examiner—Douglas W. Olms
Assistant Examiner—H. Kizou
Attorney, Agent, or Firm—Helfgott & Karas

[57] ABSTRACT

In an asynchronous transfer mode switching system, the logical channel number contained in a cell from a user station is translated in an associated one of line circuits to an assigned logical channel number. A self-routing network reads successive bits of the assigned logical channel number of the cell as it propagates through the network to a desired one of cell buffers. A controller receives user information from the line circuits and determines the assigned logical channel number. A waiting buffer is connected from one of the network's outgoing line terminals to one of its incoming line terminals. If the storage level of the cell buffer which is desired by the cell is higher than a predetermined level and if the cell belongs to a class demanding a high grade of service, the controller changes the assigned logical channel number so that the cell is routed from the line circuit through the network to the waiting buffer. When the storage level of the desired buffer subsequently reduces below the predetermined level, the logical channel number of the cell in the waiting buffer is altered so that it is routed through the network from the waiting buffer to the desired buffer.

5 Claims, 5 Drawing Sheets

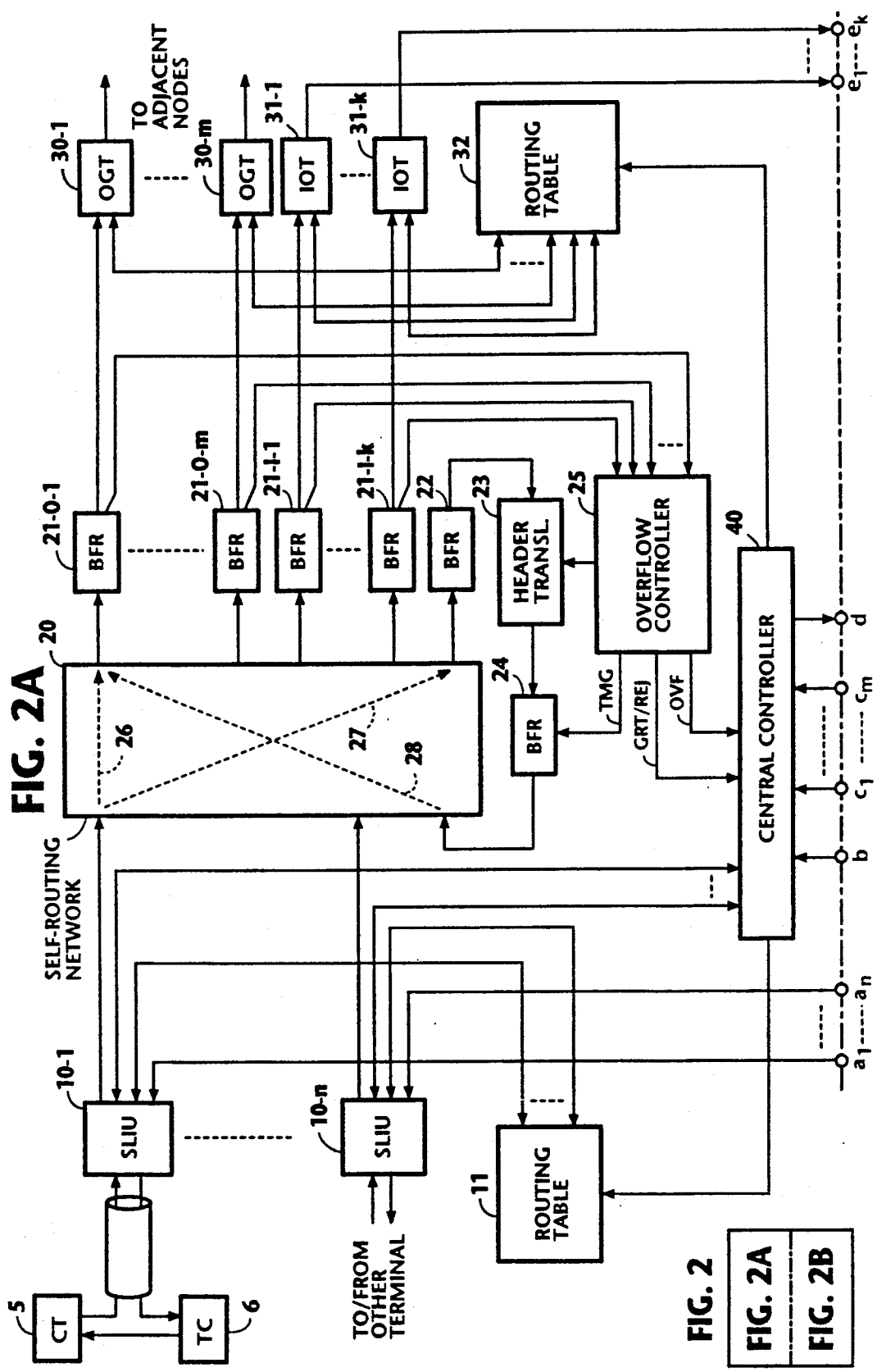

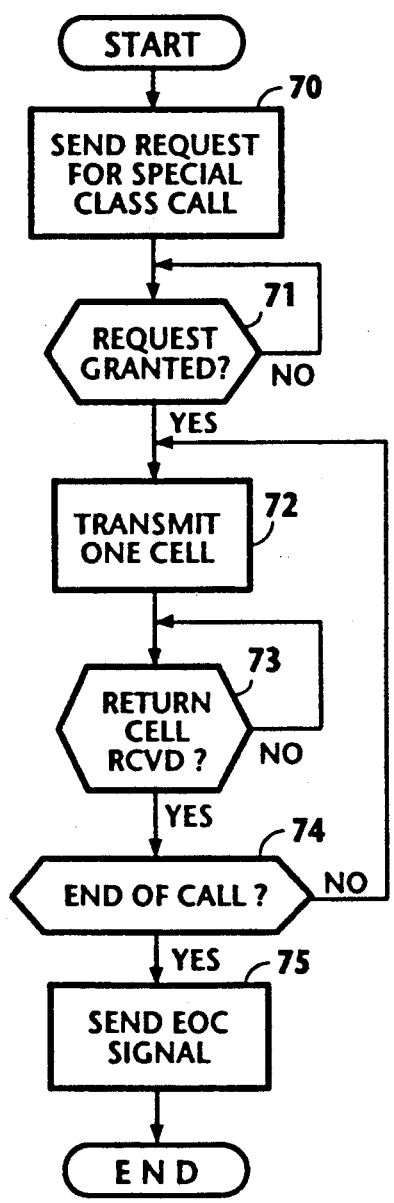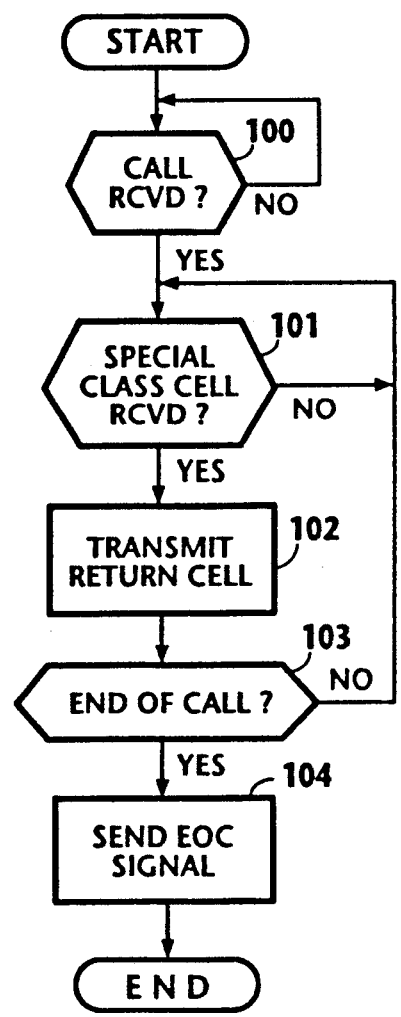

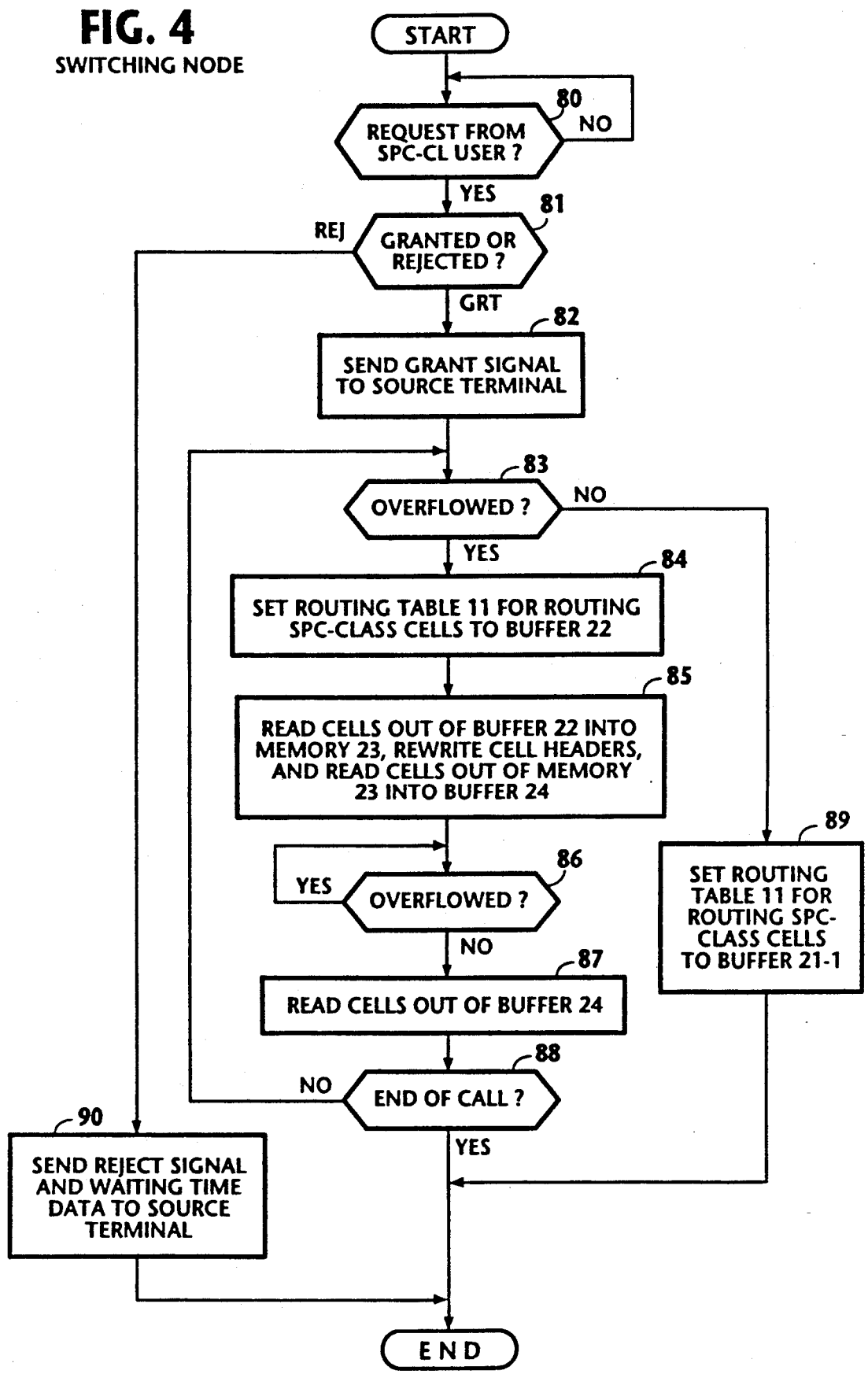

ASYNCHRONOUS TRANSFER MODE SWITCHING NETWORK USING WAITING BUFFERS FOR ROUTING HIGH SERVICE GRADE CELLS DURING CONGESTED TRAFFIC

BACKGROUND OF THE INVENTION

The present invention relates generally to switching systems, and more specifically to an asynchronous transfer mode (ATM) switching system which is suitable for application to integrated services digital networks (ISDNs).

With the ATM switching systems currently under development, self-routing networks are contemplated for routing a "cell" by reading a successive bit of the logical channel number contained in the cell header as it finds its way through several stages of elemental switches to a desired output terminal of the network. Because of the self-routing nature of the network, there is a likelihood that several cells simultaneously want to access the same output terminal and congestion results at that terminal. To solve the congestion problem, cell buffers are connected to the output terminals of the self-routing network to store a cell in a waiting line when the associated transmission line is found busy and forward it immediately when the line becomes available. The storage capacity of each buffer is so determined that it can handle cells with a probability that a buffer overflow occurs for every $10^9$ to $10^{10}$ cells.

In order to handle calls with a speed as low as 64 kbps to calls as high as 150 Mbps using buffers of finite capacity while keeping the probability of buffer overflow at a considerably low value, it would be necessary to employ call restriction procedures to limit the number of calls to be accepted. However, this procedure would result in low utilization efficiency of transmission lines.

SUMMARY OF THE INVENTION

It is therefore an object of the present invention to provide an ATM switching system which allows efficient use of transmission lines.

This object is obtained by offering different grades of service according to different needs of users by temporarily storing cells of high service grade in a separate buffer when an overflow is likely to occur in a desired cell buffer and forwarding them to that buffer when its storage level reduces below a specified level.

According to the present invention, there is provided an asynchronous transfer mode switching system for serving user stations of different grades of service. The system comprises a plurality of line circuits associated respectively with the user stations. Each of the line circuits is capable of rewriting a virtual channel identifier contained in a cell transmitted from the associated user station with an assigned logical channel number. A self-routing network is provided having a plurality of input terminals to which the line circuits are connected and a plurality of output terminals to which first, cell buffers are connected. In the self-routing network, the cell is routed to any one of the output terminals depending on the assigned logical channel number contained in that cell. A second, waiting buffer is connected in a circuit leading from one of the output terminals of the network to one of its input terminals. An overflow detector is connected to the first buffers to determine whether the storage level of the buffer which is desired by the cell is higher or lower than a predetermined level. A routing controller is associated with the line circuits for receiving information from the user stations to determine the assigned logical channel number. The controller causes one of the line circuits to change the assigned logical channel number so that the cell is routed from the line circuit through the self-routing network to the second buffer when the storage level is determined as being higher than the predetermined level, and changing the logical channel number of the cell in the second buffer when the storage level is subsequently determined as being lower than the predetermined level so that the cell is routed from the second buffer through the self-routing network to the desired first buffer.

BRIEF DESCRIPTION OF THE DRAWINGS

The present invention will be described in further detail with reference to the accompanying drawings, in which:

FIGS. 2A and 2B are block diagrams of an ATM switching node according to the present invention;

FIG. 3 is a flowchart illustrating the operation of a special-class source user terminal;

FIG. 4 is a flowchart illustrating the operation of the switching node; and

FIG. 5 is a flowchart illustrating the operation of a special-class destination user terminal.

DETAILED DESCRIPTION

Figure 1:
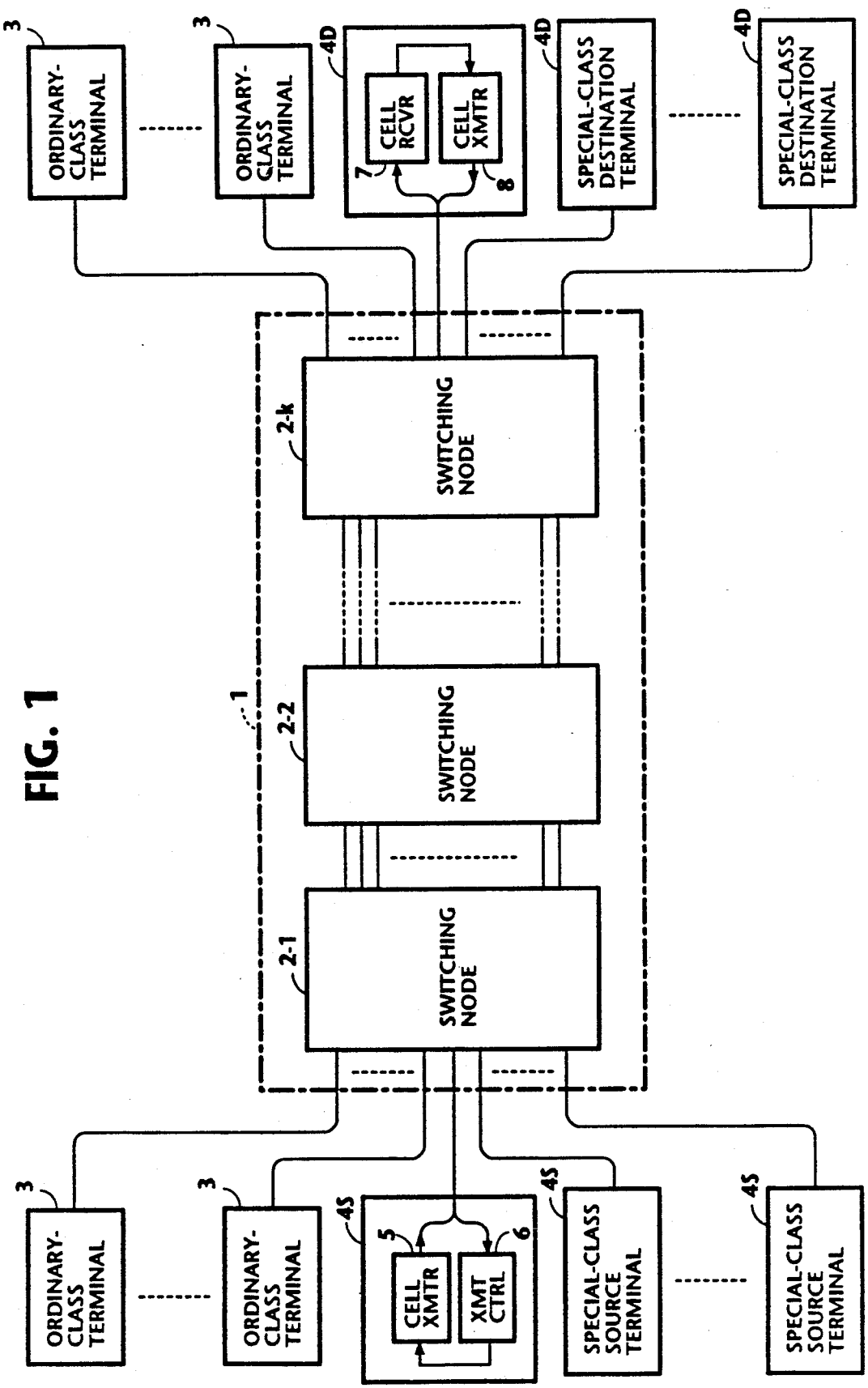
FIG. 1 is a block diagram of an asynchronous transfer mode communication system of the present invention.

Referring now to FIG. 1, there is shown a communications system according to an embodiment of this invention. User terminals are served by an ATM (asynchronous transfer mode) network 1 formed by interconnected ATM switching nodes 2-1, 2-2. . . 2-$k$. User terminals 3 having the basic grade of service are designated ordinary-class terminals and those having a higher grade of service are designated special-class source terminals 4S and special-class destination terminals 4D. The user terminals, regardless of their service grades, transmit information through the network in the form of short packets, called "cells" each having a predetermined number of bits. Each special-class source terminal 4S includes a cell transmitter 5 and a transmit controller 6 and each special-class destination terminal 4D includes a cell receiver 7 and a return-cell transmitter 8.

A cell, which is sent from the cell transmitter 5 of a source terminal 4S to node 2-1, is routed through nodes 2-2 to 2-$k$ to the cell receiver 7 of a destination terminal 4D, and a return cell is transmitted back from its return-cell transmitter 8, routed through the network and received by the transmit controller 6 of the source terminal 4S. Each cell from source terminal 4S contains a header which includes information identifying the type of the cell being transmitted, a virtual channel identifier as it is called by CCITT and an error check code for detecting header errors. As will be described, the transmit controller 6 controls the cell transmitter 5 so that it is allowed to transmit each successive cell following the receipt of each return cell from a destination terminal.

Figure 2B:
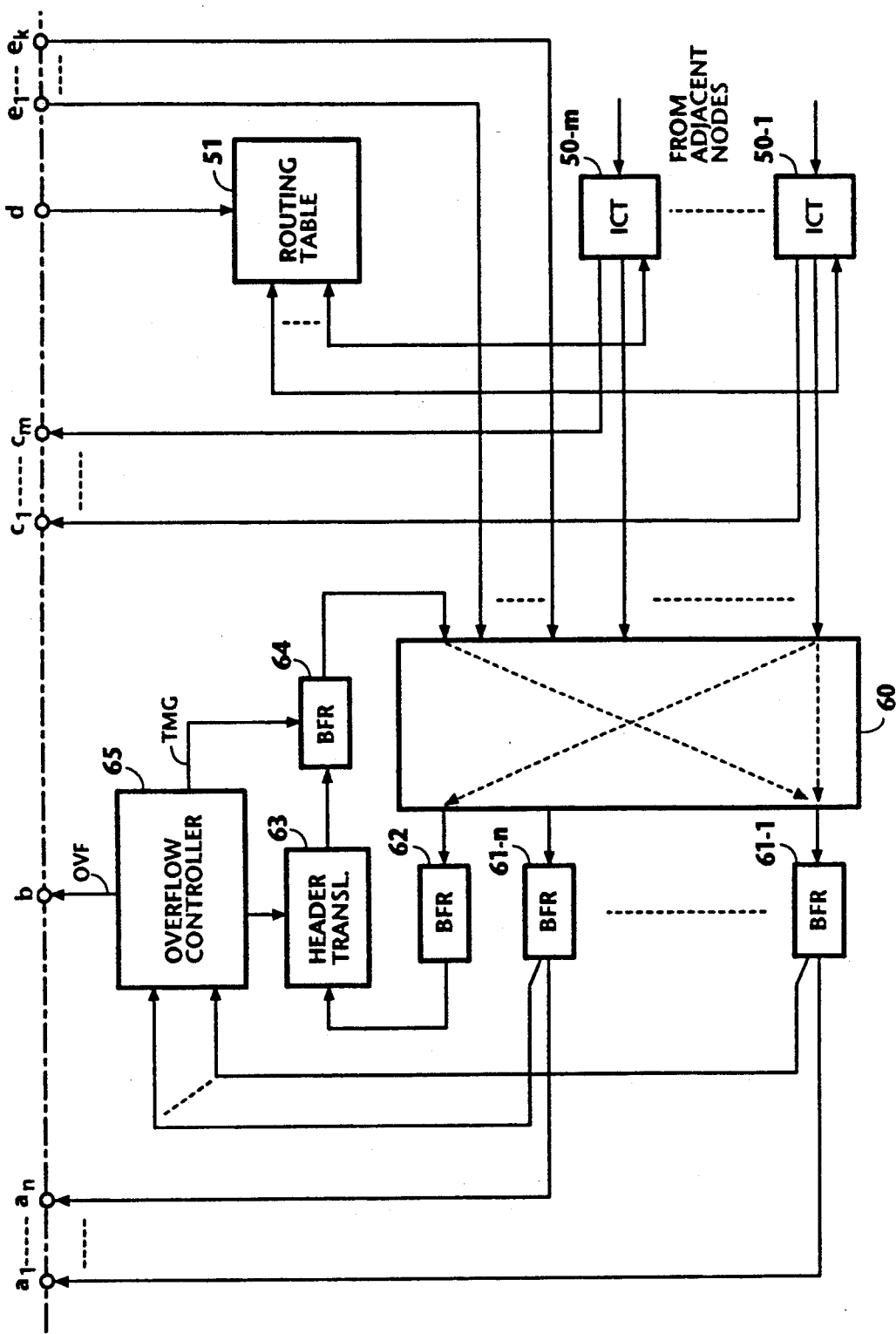

As schematically illustrated in FIGS. 2A and 2B, each of the ATM switching nodes 2 comprises subscriber line interface units (SLIU) 10-1 through 10-$n$ to which user terminals of different service grades are terminated through two-way transmission lines. The data output terminals of all SLIU's 10 are connected to corresponding incoming line terminals of an outbound self-routing network 20. A plurality of cell buffers 21-O-1 through 21-O-m are connected to outgoing line terminals of the network 20 for receiving the outbound cells of interoffice calls. The outputs of buffers 21-O are connected respectively through outbound, or outgoing (one-way) trunk circuits 30-1-30-m to corresponding inbound trunks of adjacent switching nodes. Cell buffers 21-l are further connected to the network 20 to receive the cells of intraoffice calls. The outputs of buffers 21-l are connected respectively through one-way intraoffice trunk circuits 31-1~31-k to corresponding incoming line terminals of an inbound self-routing network 60. Intraoffice trunk circuits 31-1~31-k are associated with routing table 32 for header translation purposes.

The control terminals of all line interface units 10 are connected to a central controller 40 and further to a routing table 11 in which logical channel numbers are stored. A call-setup request cell sent from an originating terminal is applied through its associated SLIU 10 to central controller 40. Normally, controller 40 examines the virtual channel identifier contained in the header of the received cell to determine the route in the network 20 and assigns a logical channel number corresponding to the determined route and stores it into routing table 11. Each SLIU 10 includes a header translator that accesses the routing table 11 on arrival from the user terminal and translates its initial logical channel number to the assigned logical channel number.

Outbound self-routing network 20 essentially comprises several stages of elemental switches each being associated with two switches of the next stage and capable of routing a cell to one of the switches of the next stage by reading a successive bit of the assigned logical channel number. One example of this type of network is a "Batcher Banyan Network" of the output buffer type in which elemental switches are connected in a tree-like arrangement as seen from each output terminal of the network so that each outbound cell finds its way through the network 20 from any of its incoming line terminals to any desired one of its outgoing line terminals. Cells of any service grade are stored in desired cell buffers before being forwarded to associated outgoing trunk circuits 30. These trunk circuits are connected to a routing table 31 in which outgoing logical channel numbers are stored under control of central controller 40. Each of the outgoing trunk circuits 30 includes a header translator that consults with routing table 31 to rewrite the logical channel number of the outbound cell with an outgoing logical channel number stored in routing table 31.

According to the present invention, a waiting buffer 22 is connected to an outgoing line terminal of the network 20 for exclusively storing special-class cells to prevent them from being discarded when an overflow condition exists in a desired one of cell buffers 21-O or 21-l. The output of waiting buffer 22 is connected to a header translator 23 in which special-class cells from buffer 22 are stored. The output of header translator 23 is connected through an output buffer 24 to an incoming line terminal of network 20. An overflow controller 25 is provided to monitor the storage levels of cell buffers 21 and waiting buffer 22 to determine whether the total volume of traffic offered to the outbound network 20 is below or above a specified level. Overflow controller 25 is also connected to header translator 23 to retranslate the logical channel number of the headers of the stored special-class cells to allow them to be routed through network 20 from the incoming line terminal to which the output buffer 24 is connected to the desired cell buffer when the overflow condition ceases to exist.

As will be described in detail later, overflow controller 25 supplies a "grant" or "reject" signal to central controller 40 indicating whether the traffic is below or above the specified level, respectively. If a call is originated from a special-class user and the total traffic exceeds the specified level, a "reject" signal is generated by overflow controller 25 and central controller 40 responds to this signal by communicating this fact to that user through the associated SLIU to wait for a specified interval of time before sending a subsequent signal.

Overflow controller 25 proceeds to monitor the storage level of the buffer which is accessed by special-class cells and supplies an "overflow" signal to central controller 40 if the monitored buffer is being overflowed. In order to prevent the special-class cells from accessing the overflowed buffer, central controller 40 responds to this signal by rewriting the routing table 11 so that, upon consultation with the SLIU associated with the calling special-class terminal, the incoming logical channel number of each successive cell is translated to a predetermined logical channel number that causes the cell to be routed to waiting buffer 22, regardless of the location of the incoming line terminal of the network at which the special-class cell appears. When the storage level of the desired cell buffer reduces below a specified level, overflow controller 25 causes output buffer 24 to forward the special-class cells stored therein at appropriate timing to network 20. In this way, the special-class cell read out of buffer 24 finds its way through the network 20 to the desired buffer having vacant storage locations.

Inbound cells from adjacent nodes are received by inbound, or one-way incoming trunk circuits 50-1~50m. The data output terminals of incoming trunk circuits 50 are connected to corresponding incoming line terminals of inbound self-routing network 60 and their control terminals are connected to central controller 40 as well as to a routing table 51. Routing table 51 stores route number information supplied from controller 40 in response to the arrival of an inbound cell. Buffers 61 are connected to corresponding outgoing line terminals of network 60 to receive the inbound cells, the outputs of all buffers 61 being connected to the data input terminals of SLIU's 10-1~10-n, respectively.

In a manner similar to the outgoing section of the switching node, a waiting buffer 62 is connected to the network 60 to receive inbound special-class cells when an overflow condition exists in one of the cell buffers 61 to which they are to be destined. The output of waiting buffer 62 is connected to a header translator 63 whose output is in turn connected through an output buffer 64 to an incoming line terminal of network 60. An overflow controller 65 monitors the storage level of each of the cell buffers 61 and supplies an "overflow" signal to central controller 40 if the desired buffer is overflowed if the inbound cell is a special-class call. In response to this signal, central controller 40 rewrites the logical channel number of the inbound special-class cell with a predetermined logical channel number that causes the cell to be routed through the network 60 to waiting buffer 62. When the overflow condition ceases to exist, controller 65 directs the header translator 63 to translate the header of inbound special-class cells and supplies them to output buffer 64, which is subsequently read at appropriate timing by controller 65 and forwarded to network 60. In a manner similar to header translator 23, the headers of the inbound special-class cells are rewritten so that they are routed through the network 60 to the desired buffer now vacant.

Detailed operation of the ATM switching system of this invention will now be given below with reference to FIGS. 3, 4 and 5.

The transmit controller 6 of each source user terminal is programmed as shown in FIG. 3. The program starts with the execution of step 70 which directs the sending of a call-setup request for special-class cells to the serving switching node.

This request signal is applied through the associated SLIU 10 to central controller 40, causing it to initiate the execution of a program shown in FIG. 4. This program starts with decision step 80 which checks to see if the request is from a special-class user terminal. If the answer is affirmative, exit is to step 81 to check to see if there is a "grant" or "reject" signal from controller 25. If the total of the storage levels of cell buffers 21 exceeds the specified level, a "reject" signal is supplied from overflow controller 25, and central controller 40 moves to step 90 to return a "reject" signal as well as waiting time data to the source terminal indicating how long it should wait before sending a subsequent cell, with control moving ahead to the end of the program.

Otherwise, control proceeds to step 82 to return a "grant" signal to that user terminal, allowing it to transmit a special-class cell (step 72) with a header containing a specified incoming logical channel number. Exit then is to step 83 to examine the contents of the request signal to determine which one of the buffers 21-O-1~21-O-m the call is destined to and proceeds to check to see if the storage level of the desired buffer is above or below the specified value. Assume that the cell desires to access buffer 21-O-1. If this buffer is not overflowed, the decision in step 83 is negative and control exits to step 89 to set the routing table 11 to route the special-class cell to buffer 21-O-1 as indicated by a dotted line 26 in FIG. 2A. If this buffer is overflowed with cells from other user terminals, the decision in step 83 is affirmative and control exits to step 84 to store a logical channel number into routing table 11 so that the cell sent from the granted user terminal is routed to waiting buffer 22 through network 20 as indicated by a dotted line 27.

Exit then is to step 85 to read special-class cells out of waiting buffer 22 to header translator 23 to retranslate their headers for routing them to the desired cell buffer 21-O-1 and forward them to output buffer 24. Control moves to step 86 to check to see if the buffer 21-O-1 is still overflowed. If the answer is negative, control exit to step 87 to read a cell out of buffer 24 at appropriate network timing to self-routing network 20 to cause the cell to be routed to the desired buffer 21-O-1 as indicated by a dotted line 28.

Control now advances to step 88 to check to see if there is an end-of-call signal. If there is none, control returns to step 83 to repeat the process for subsequent special-class cells. At the end of a call, control terminates the execution of the program.

The call-setup request (cell) is first transmitted through successive switching nodes and arrives at a destination terminal, causing the cell receiver 7 to initiate the execution of a program shown in FIG. 5. Immediately following the reception of the call-setup request from the source terminal (step 100), control goes to step 101 to check to see if the received cell belongs to the special-class. If the answer is affirmative, control proceeds to step 102 to transmit a return cell with a header containing a logical channel number assigned in accordance with the information contained in the received call-setup cell. This return cell is propagated through the network to set up a route in the opposite direction to the source terminal (step 73), whereupon control of the source terminal moves to step 74 to check to see if there is a cell to transmit. If this is the case, control returns to step 72 to repeat the process. If there is no cells to transmit, control recognizes it as the end of call and the answer in step 74 is affirmative to proceed to step 75 to send and end-of-call signal for clearing the forward connection. Likewise, in the destination terminal, control moves to step 103 to check for the presence of a return cell. If there is one, control returns to step 101 to repeat the process. If there is no return cell to transmit, control advances to step 104 to send and end-of-call signal to clear the backward connection.

It is seen therefore that special-class cells originated from different user terminals may be stored in succession into buffer 22. Since each successive cell of the special-class is transmitted from a given user terminal only after reception of a return cell, there is no likelihood of the waiting buffer 22 being overflowed if the number of special-class user terminals served by each switching node is set equal to the number of cells that can be stored in waiting buffer 22.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for controlling an asynchronous transfer mode switching system which serves user stations belonging to different service classes according to different grades, each of the user stations sending a cell indicative of a service class of the associated user station, said switching system having a plurality of line circuits associated respectively with said user stations for translating a channel identifier contained in a cell from the associated user station to a logical channel number, comprising the steps of:

a) causing a first cell indicative of a service class of lower grade from said line circuits to be routed through a self-routing network to one of first buffers according to the logical channel number of said first cell;

b) causing a second cell indicative of a service class of higher grade from said line circuits to be routed through said self-routing network to said one of the first buffers according to the logical channel number of said second cell if storage level of said one of said first buffers is lower than a specified level and causing said second cell to be routed through said self-routing network to a second buffer if the storage level of said one of the first buffers is higher than said specified level; and c) changing the logical channel number of the second cell in said second buffer and forwarding said second cell from said second buffer to said self-routing network when the storage level of said one of the first buffers subsequently reduces below said specified level to thereby cause said second cell to be routed through said network to said one of the first buffers.

2. An asynchronous transfer mode switching system for serving user stations belonging to different service classes according to different grades, each of said user stations transmitting a cell indicative of a service class of the associated user station, comprising:

a plurality of line circuits associated respectively with said user stations, each of said line circuits being capable of translating a channel identifier contained in a cell from the associated user station to a logical channel number;

a plurality of first buffer;

self-routing switch means having a plurality of incoming line terminals to which said line circuits are connected and a plurality of outgoing line terminals to which said first buffers are connected, said switch means routing said cell to any one of said outgoing line terminals depending on the logical channel number of said cell;

a second buffer connected in a circuit leading from one of said outgoing line terminals of the self-routing switch means to one of said incoming line terminals thereof;

overflow detector means connected to said first buffers to determine whether a storage level of one of the first buffers desired by said cell is higher or lower than a predetermined storage level when said cell is indicative of a service class of higher grade than that of a predetermined service class;

routing control means associated with said line circuits for receiving cells from said user stations for determining logical channel numbers of the received cells according to information contained in the received cells, changing the logical channel number of a subsequent cell indicative of the service class of higher grade when the storage level is determined by said overflow detector means as being higher than said predetermined storage level so that said subsequent cell is routed from a respective line circuit through said self-routing switch means to said second buffer, and changing the logical channel number of the cell in said second buffer when the storage level is subsequently determined by said overflow detector means as being lower than said predetermined storage level so that said cell is routed from said second buffer through said self-routing switch means to said one of the first buffers.

3. As asynchronous transfer mode switching system as claimed in claim 2, wherein said overflow detector means further detects a total volume of the storage levels of said first buffers, and wherein said control means is responsive to the detected total volume of the storage levels for rejecting a cell indicative of the service class of higher grade if said total volume exceeds a predetermined value.

4. An asynchronous transfer mode switching system as claimed in claim 2, wherein each of the user stations which belong to the service class of higher grade transmits each subsequent cell following reception of a cell from a destination user station acknowledging receipt of a previous cell.

5. An asynchronous transfer mode switching system is claimed in claim 4, wherein said second buffer is capable of storing cells substantially equal in number to the number of user stations which belong to the service class of higher grade.

* * * * *